United States Patent
Daum et al.

(10) Patent No.: US 6,242,922 B1
(45) Date of Patent: Jun. 5, 2001

(54) ARC DETECTION ARCHITECTURE BASED ON CORRELATION FOR CIRCUIT BREAKERS

(75) Inventors: Wolfgang Daum, Louisville, KY (US); Daniel Arthur Staver, Scotia, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/186,703

(22) Filed: Nov. 6, 1998

(51) Int. Cl.[7] .................................................... G01R 31/32
(52) U.S. Cl. ........................................... 324/520; 324/536
(58) Field of Search .................................... 324/536, 613, 324/520–522; 361/42, 93.6; 702/57–59, 64, 65, 69, 126, 189, FOR 103, FOR 104, FOR 106; 700/286, 292–294

(56) References Cited

U.S. PATENT DOCUMENTS

| | | | |
|---|---|---|---|
| 4,811,112 | * 3/1989 | Rutledge | 358/260 |
| 5,105,276 | * 4/1992 | Schrock | 358/213.16 |
| 5,200,737 | * 4/1993 | Konishi et al. | 340/644 |
| 5,223,795 | * 6/1993 | Blades | 324/536 |
| 5,578,931 | * 11/1996 | Russell et al. | 324/536 |
| 5,682,101 | * 10/1997 | Brooks et al. | 324/536 |
| 5,691,869 | * 11/1997 | Engel et al. | 361/42 |
| 5,726,576 | * 3/1998 | Miyata et al. | 324/536 |
| 5,729,145 | * 3/1998 | Blades | 324/536 |
| 5,818,215 | * 10/1998 | Miyamae et al. | 324/76.27 |
| 5,831,538 | * 11/1998 | Schena | 340/635 |
| 5,839,092 | * 11/1998 | Erger et al. | 702/58 |
| 5,930,159 | * 5/1999 | Miyata et al. | 324/536 |
| 5,982,817 | * 11/1999 | Wuppermann | 375/244 |

* cited by examiner

*Primary Examiner*—Safet Metjahic
*Assistant Examiner*—Vincent Q. Nguyen
(74) *Attorney, Agent, or Firm*—Marvin Snyder; Douglas E. Stoner

(57) ABSTRACT

A low cost mixed analog digital application specific integrated circuit (ASIC) includes a standard central processing it (CPU) programmed to execute a correlation function for arc detection. Use of a standard CPU is possible because need for digital fourier analysis is eliminated by the ASIC architecture. The SIC includes a power supply configured to be coupled to an AC power line for supplying power to the ASIC components, and further includes a current sensor coupled to a current-carrying conductor for generating a signal representative of current in the conductor. A first analog-to-digital converter (ADC), coupled in series with the current sensor, has its output coupled to a central processing unit (CPU). The CPU supplies a digital-to-analog converter (DAC) with a digital signal representative of a portion of the sensed current. The DAC supplies this signal, in analog form, to a summer, which also receives an output signal from the current sensor. The summed analog output signal of the summer is converted to digital form by a second ADC and is supplied to the CPU. The CPU output is coupled to a trigger, e.g., a trigger of a circuit breaker.

24 Claims, 6 Drawing Sheets

ARC DETECTION ARCHITECTURE BASED ON CORRELATION FOR CIRCUIT BREAKERS

FIELD OF THE INVENTION

This invention relates generally to circuit breakers and, more particularly, to arc detection in residential type circuit breakers.

BACKGROUND OF THE INVENTION

Although detection of arcs is desirable to reduce the possibility of a fire being ignited by an arc and to protect building wiring and consumer wiring, such as extension cords and appliance cords, as well as appliances themselves, known residential type circuit breakers typically do not include an arc detection unit. Arcs can generally be identified by the high frequency content of current in a branch circuit. High frequency current, i.e., current having a frequency exceeding the range of 1 KHz to 10 MHz, can be introduced into the branch circuit through benign apparatus such as universal motors in hair driers, drills, and vacuum cleaners. Such motors can produce significant high frequency energy due to arcing of the brush motor commutation. Silicon controlled rectifier lamp dimmers and advanced electronic devices can also generate high frequency energy. Discriminating between actual arcing faults and benign sources of high frequency energy is therefore more difficult than merely sensing a high frequency. A residential arc detection unit, however, must have a low nuisance trip rate, i.e., low false alarm rate. Known arc detection units having the necessary low false alarm rate are complex and therefore expensive.

To reduce the costs of arc detection units, some known circuit breakers include central processing units that execute algorithms to eliminate possible noise sources, such as electric household appliances and tools (e.g., motors, welders, switches). Such known algorithms include fourier analysis and other frequency domain based approaches. The noise sources are eliminated from the primary signal by classifying the noise resulting from such sources, and then using such classified signals to identify noise signals and sources in the primary signal. The noise signals are then subtracted from the primary signal so that the noise portion of the signal is eliminated.

The functional requirements for digital signal processing based on elimination of noise sources requires correct classification of noise signals followed by storage of data, i.e., storage of the primary signal portion associated with the noise signal. The processing power necessary to provide this function is high and increases linearly with the number of noise sources present as well as about with the square of the frequency range considered due to the Fourier Transform requirements.

It would be desirable to provide protection for a residence from arc type faults, including fault isolation and location. It would also be desirable to provide such protection at a low cost as compared to the costs associated with using sophisticated arc detection units.

SUMMARY OF THE INVENTION

Apparatus for detecting arcs from a signal provided by a current sensor includes a mixed analog digital application specific integrated circuit (ASIC) employing a standard central processing unit (CPU) with a reduced digital signal processing (DSP) load and programmed to execute a correlation function for arc detection. Use of such a standard CPU is possible because the DSP overhead needed for digital fourier analysis is eliminated by the ASIC architecture. Further, by enabling use of a standard CPU, fabrication cost of the ASIC can be substantially less than the fabrication cost associated with known arc detection units.

In an exemplary embodiment, the ASIC includes a power supply configured to be coupled to an AC power line for supplying power to the ASIC components. The ASIC further includes a current sensor coupled to a current-carrying conductor of, for example, a circuit breaker. The current sensor is located adjacent the breaker current path so that the sensor generates a signal representative of current in the conductor. The ASIC further includes a first analog-to-digital converter (ADC) coupled in series with the current sensor. The first ADC has its output coupled to a central processing unit (CPU). The CPU may, for example, be a general purpose type CPU, which is well known in the art. Output signals of the first ADC can be used by the CPU to implement overcurrent-tripping algorithms, which also are well known in the art.

The CPU includes an output coupled to a digital-to-analog converter (DAC), and the CPU supplies the DAC with a digital signal representative of a portion of the sensed current. The DAC is coupled to a summer, which also is coupled to an output of the current sensor. The output of the summer is coupled to a second analog-to-digital converter (ADC), and the output signal of the second ADC is supplied as an input signal to the CPU. A CPU output is coupled to a trigger or actuator, e.g., a trigger of a circuit breaker.

In operation, the current sensor produces an analog signal representative of current in the circuit breaker conductor. The analog signal is converted to a digital signal by the first ADC, and the digital signal produced by the first ADC is supplied to the CPU. The CPU processes the received digital signal and filters the received digital signal to remove, for example, the noise portion of the digital signal. The filtering function can be achieved by standard digital signal processing techniques. The CPU then supplies to the DAC a substantially noise free digital signal, e.g., a substantially noise free 50 Hz or 60 Hz signal. The DAC converts the noise free digital signal to an analog signal, and the substantially noise free analog signal is supplied to the summer.

The summer subtracts the substantially noise free analog signal from the analog signal supplied by the current sensor so that the 50 Hz or 60 Hz signal component is removed therefrom. Subtracting the 50 Hz or 60 Hz signal component from the sensor output signal provides differential sensitivity improvement. The signal produced by the summer is then supplied to the second ADC which converts the summer output signal to a digital signal which is supplied to the CPU. The output signal of the second ADC substantially contains the noise generated by the arc with the 50 Hz or 60 Hz signal component removed for further processing at the higher sensitivity.

The CPU executes a correlation function using the digital signal received from the second ADC. One correlation function that can be used in the CPU is a sliding windows function that emulates fourier frequency analysis in real time, thus eliminating the need for digital fourier analysis and hence reducing the CPU processing power required and associated costs. Although the arc signature includes the frequency range of 1 KHz to 10 KHz, the detection can be limited to several hundreds of hertz, such as 300 Hz, up to several tens of KHz, such as 20 KHz, to best suit the processing speed available for simple CPUs. As higher processing speeds are made available at substantially the same cost with the advance of semiconductor circuitry, the range covered by the correlator can be extended. The exact choice between frequency range for the correlator and the number of correlation taps can be traded off with the detection accuracy. By limiting the frequency range to 300 Hz up to 20 Khz, contributions from parasitic noise sources, such as radio transmission, switching power supplies, and rectifiers are substantially eliminated while the arc energy in this frequency range is detected on a dominant basis. To further enhance the detection accuracy, a superimposed 50 Hz or 60 Hz half cycle signature may be used, thus distinguishing the arc from the signature of parasitic arcs, such as generated by motor brushes operating at different frequencies. The correlation algorithms employed by the invention are based on detection, not elimination of noise sources.

To perform the correlation type of function, one possibility is to provide for the computation of a set of band-pass type filters and perform them over multiples or fractional multiples of the fundamental frequency (i.e., 50 or 60 Hz). The filtered signals are then used to determine the power associated with the noise or arc signal over the bandwidth of interest. One alternative is to provide for substantial harmonic rejection filtering of the digitized signal before performing the correlation type of signal processing.

Another approach is to phase lock onto the incoming fundamental signal, and then under-sample such that all harmonics of the fundamental frequency (50 or 60 Hz) alias onto themselves or to within controlled bandwidths. This reduces the sample rates and reduces the filtering to a few bands of interest such as to reduce complexity of filtering out the fundamental signal and its harmonics. Alternatively, a phase-locked approach can be approximated by tracking the fundamental frequency and using that to under-sample by an adjustable amount. This approach constrains the fundamental frequency and its harmonic components to alias near each other to within a constrained bandwidth. If the fundamental frequency changes beyond a set range, the re-sampled rate is adjusted so as to bring the fundamental frequency and harmonics back into the desired bandwidth.

In the drawings, like reference numerals indicate like components.

DETAILED DESCRIPTION

A mixed signal application specific integrated circuit (ASIC) architecture in accordance with one embodiment of the present invention is described below in detail. Although the subject ASIC is sometimes described herein for use in residential applications, it should be understood that such ASIC may be utilized in applications other than residential applications. In addition, the ASIC can be incorporated into known circuit breakers or implemented separately from such circuit breakers, and is not limited to practice with any one particular type of circuit breaker.

Figure 1:
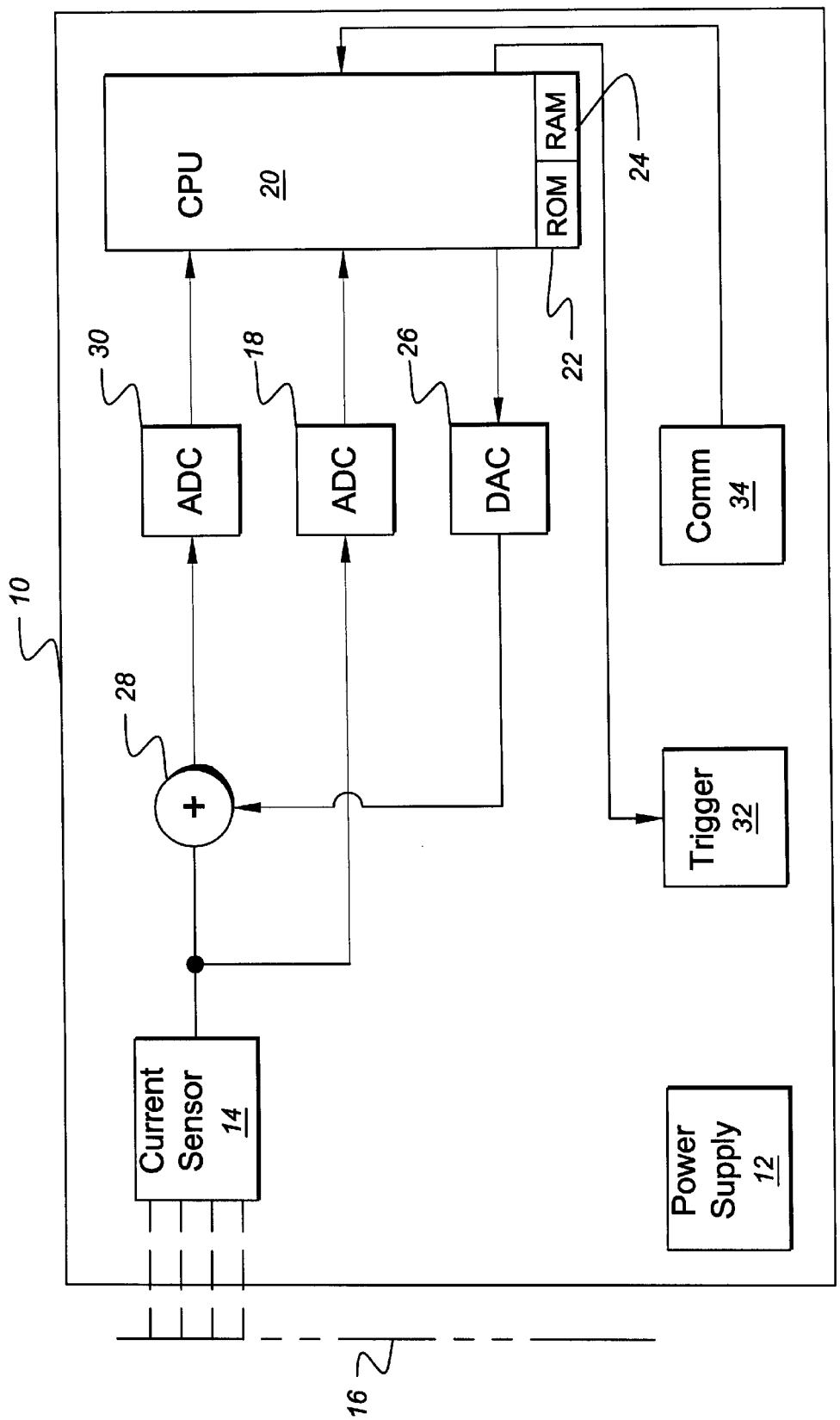
FIG. 1 is a block diagram of a mixed signal application specific integrated circuit architecture in accordance with one embodiment of the present invention.

FIG. 1 illustrates an exemplary embodiment of an ASIC constructed in accordance with a preferred embodiment of the invention, and includes a power supply 12 coupled to an AC power line (not shown) either directly or via current transformers. Power supply 12 may conveniently comprise a shunt regulating type power supply.

ASIC 10 further includes a current sensor 14 coupled to a current-carrying conductor 16 of, for example, a circuit breaker. Current sensor 14 is located adjacent the breaker current path so that sensor 14 can generate a signal representative of current in conductor 16. Current sensor 14 may comprise a current transformer or a current-to-voltage transducer, both of which are known in the art. Current sensor 14 can be separate from ASIC 10 or integral with ASIC 10 as illustrated in FIG. 1.

ASIC 10 further includes a first analog-to-digital converter (ADC) 18 coupled in series with current sensor 14. ADC 18 has its output coupled to a central processing unit (CPU) 20. CPU 20 includes a read only memory (ROM) 22 and a random access memory (RAM) 24 which are utilized in detection of arcs. CPU 20 may, for example, be an 8051 type general purpose microprocessor, which is well known in the art.

CPU 20 includes an output coupled to a digital-to-analog converter (DAC) 26. CPU 20 supplies DAC 26 with an analog signal representative of a portion of the sensed current from ADC 18. DAC 26 is coupled to a summer 28, which also is coupled to an output of current sensor 14. The output of summer 28 is coupled to a second ADC 30, the output of which is coupled to CPU 20. A CPU output is coupled to a trigger, e.g., a trigger 32 of a circuit breaker. A port of CPU 20 may be coupled to a communications circuit 34 for receiving external communications, e.g., externally generated commands and data. The communication function of ASIC 10 can provide bi-directional data transfer.

In operation, current sensor 14 supplies an analog signal representative of current in circuit breaker conductor 16. The analog signal is converted to a digital signal by ADC 18, and the digital signal produced by ADC 18 is supplied to CPU 20. CPU 20 processes the received digital signal and filters the received digital signal to remove, for example, the noise portion of the digital signal. CPU 20 then supplies to DAC 26 a substantially noise-free digital signal, e.g., a substantially noise-free 60 Hz or 50 Hz signal. DAC 26 converts the substantially noise-free signal to a substantially noise-free analog signal which is supplied to summer 28.

Summer 28 subtracts the substantially noise-free analog signal from the analog signal supplied by current sensor 14, removing the 60 Hz or 50 Hz signal component from the current sensor supplied signal. Subtracting out the 50 Hz or 60 Hz signal component from the sensor output signal is sometimes referred to as differential sensitivity improvement. Specifically, after subtracting out the 50 Hz or 60 Hz signal component, only the noise and arc components of the signal remain. This signal, therefore, is sensitive to changes in at least the arcing characteristic in the signal supplied by sensor 14. The output signal of summer 28 is then converted by ADC 30 to a digital signal which is supplied to CPU 20.

CPU 20 executes a correlation function using the received digital signal from ADC 30. Alternatively, the correlation function can be implemented on a correlation unit under control of CPU 20. One correlation function that can be used in either embodiment is a sliding windows function that emulates the fourier frequency analysis in real time, eliminating the need for digital fourier analysis and hence reducing the CPU processing power required and associated costs.

To perform the correlation type of function, a set of band-pass type filters can be used over multiples or fractional multiples of the fundamental frequency (i.e., 50 or 60 Hz). The filtered signals are then used to determine the power associated with the noise or arc signal over the bandwidth of interest. In addition, harmonic rejection filtering of the digitized signal can be performed before performing the correlation type of signal processing. Processing may be described as:

$$y(j)=\Sigma(i=0:m-1)V(i) \times K(i)$$

where $i=0:m-i$ for an m-point filter computation, $y(j)$= filtered output, $V(i)$=input signal, and $K(i)$=correlation filter kernel. The filter may include preprocessing of the data to remove harmonic components if desired.

If it is undesirable to expend enough DSP power to completely remove the entire 50 Hz or 60 Hz signal via DAC 26, or if the feedback signal generated by DAC 26 differs in phase or amplitude from the ideal feedback signal, a portion of the predominant 50 Hz or 60 Hz signal will remain in the signal digitized by ADC 30.

Further processing to completely remove the residual 50 Hz or 60 Hz frequency can be accomplished with standard DSP techniques; however, these techniques can be processing intensive.

Figure 4:
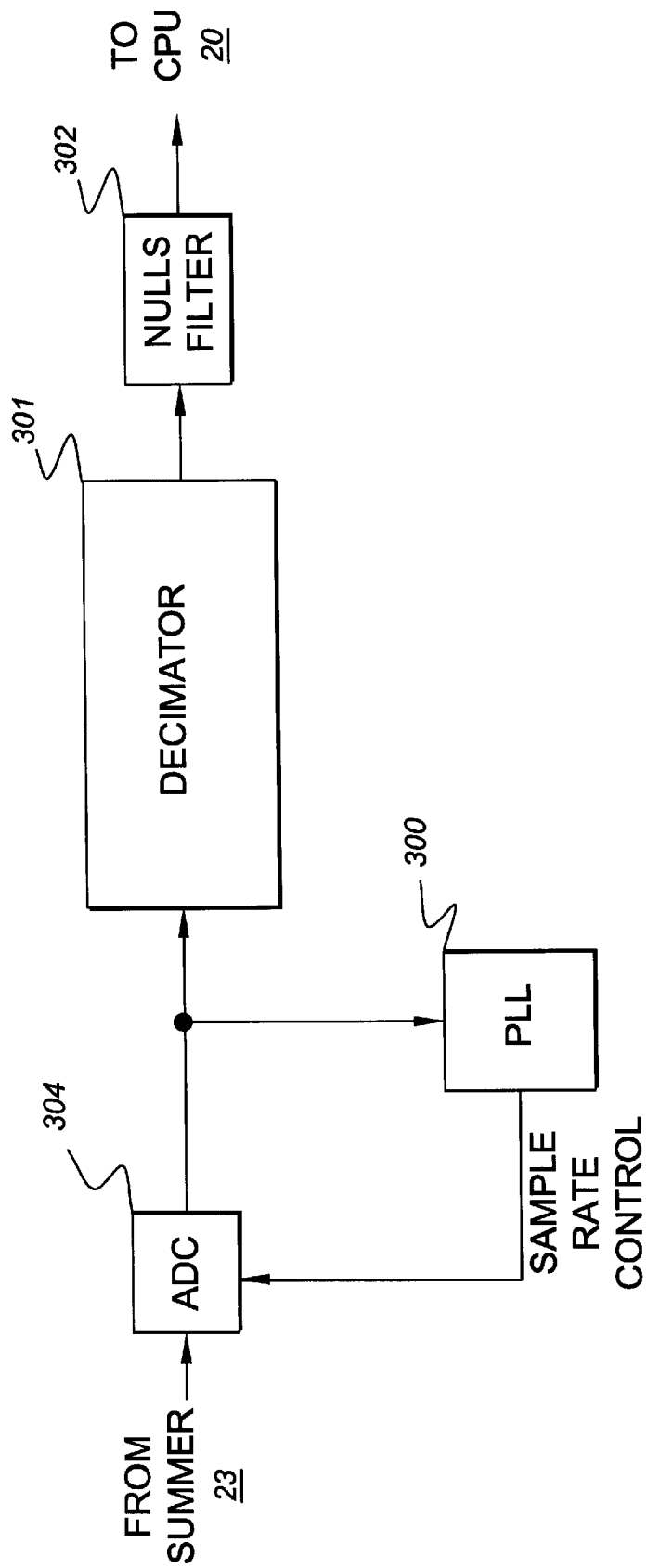
FIG. 4 is a block diagram of apparatus that may be employed between the output of summer 28 and the input to CPU 20 in each of FIGS. 1, 2 and 3, to more completely null the fundamental frequency and its harmonics while yet retaining the noise spectra indicia of arcing.

Another approach is to phase lock onto the incoming fundamental signal, and then under-sample the signal such that all harmonics of the fundamental frequency (i.e., 50 or 60 Hz) alias onto themselves or to within controlled bandwidths. This reduces the sample rates and reduces the filtering to a few bands of interest, thus reducing complexity of filtering out the fundamental frequency and associated harmonic signals. Thus, as shown in FIG. 4, a phase locked loop (PLL) circuit 300 in the embodiment shown in FIG. 4 synchronizes the sampling rate of ADCs 304 to a multiple of the fundamental line frequency; i.e., a multiple $mf_0$ of either 50 Hz or 60 Hz, where m is typically an integer or ratio and $f_0$ is the dominant fundamental line frequency, nominally 50 Hz or 60 Hz. A simple decimator (301) resamples the data stream from the higher rate $mf_o$ down to a lower rate $$\frac{mf_o}{n}$$

where n is the factor of sample rate reduction.

All signal components of the fundamental frequency $f_0$ and its harmonics are now resampled or folded to lower frequencies, which are more efficiently filtered away. As an example, if $f_0=60$ Hz and $m=100$, then the sampling frequency $f_{samp}=mf_0=6$ KHz.

By using factors of n=100, a filter of transform $$H(z) = \frac{z-1}{z}$$

and exhibiting a delay of $1-z^{-1}$ may be employed as nulls filter 302 in order to completely null the fundamental frequency and all harmonics while retaining the noise spectra indicative of arcing. Similarly, by using factors of n=50, a filter of transform $$H(z) = \frac{z^2-1}{z^2}$$

and exhibiting a delay of $1-z^2$ may be employed as nulls filter 302 to completely null the fundamental frequency and all harmonics while retaining the noise spectra indicative of arcing, while by using factors of n=25, a filter of transform $$H(z) = \frac{z^4-1}{z^4}$$

and exhibiting a delay of $1-z^4$ may be employed as nulls filter 302 for this purpose.

Thus, by phase-locking onto the fundamental frequency using a higher original sample rate as well as a second, much lower, re-sampled sample, the fundamental frequency and all harmonic components will alias down to 0 Hz and may be filtered out with a DC-removal type filter. This leaves nonfundamental frequency signal strength in the passband. In addition, if pre-filters are used before re-sampling occurs, different frequency bands may be attenuated before performing the re-sampling/filtering process.

An alternative to using a phase-locked approach would be to approximate a phase-locked approach by tracking the fundamental frequency and under-sampling the signal by an adjustable amount. This approach constrains the fundamental and harmonic components to alias near each other to within a constrained bandwidth. If the fundamental frequency changes beyond a set range, the re-sampled rate is adjusted so as to bring the fundamental and harmonic components back into the desired bandwidth.

Figure 5:
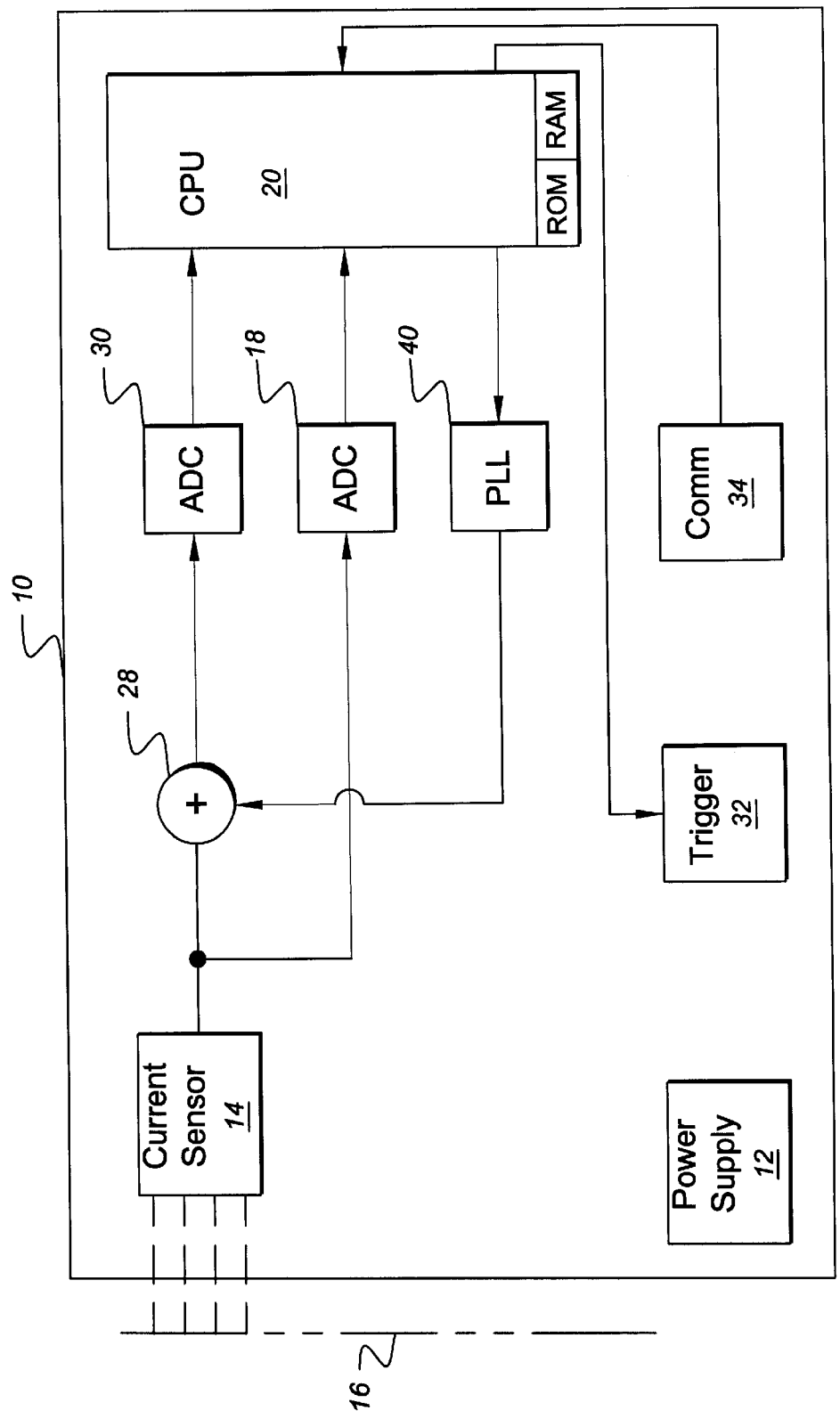
FIGS. 5 and 6 are block diagrams of alternatives to the mixed signal application specific integrated circuit architecture shown in FIG. 1.
Figure 6:
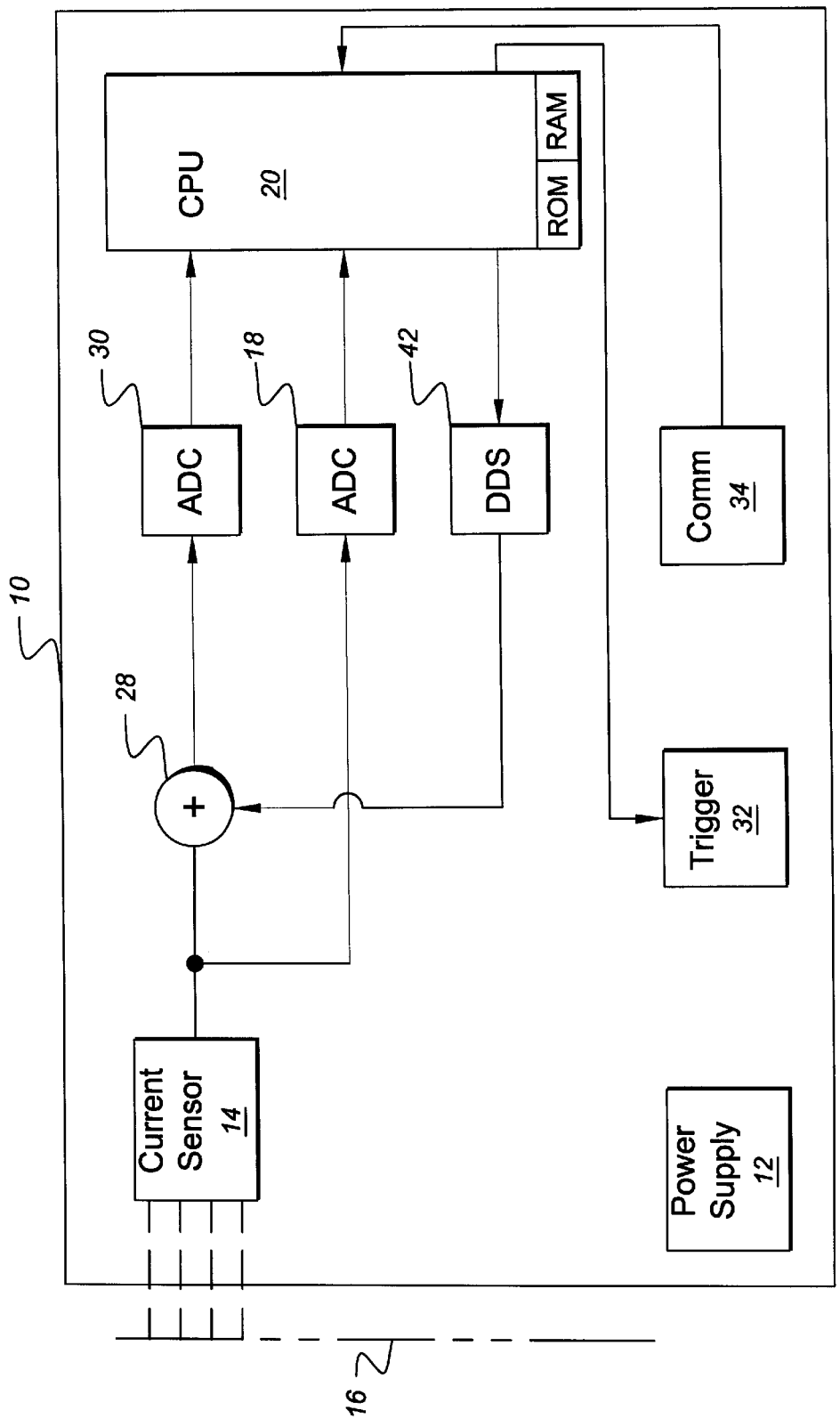

Many other alternatives to the embodiment illustrated in FIG. 1 are contemplated and possible. For example, as shown in FIG. 5, DAC 26 can be replaced by a phase locked loop (PLL) circuit 40 under CPU control that generates the 50 Hz or 60 Hz signal and supplies it to summer 28, thus freeing CPU 20 from implementing the filtering function. In another alternative embodiment as shown in FIG. 6, DAC 26 is replaced by a direct digital synthesizer (DDS) circuit 42 under CPU control that generates the 50 Hz or 60 Hz signal without requiring that CPU 20 perform any filtering. The output signal of the DDS is supplied directly to summer 28.

Figure 2:
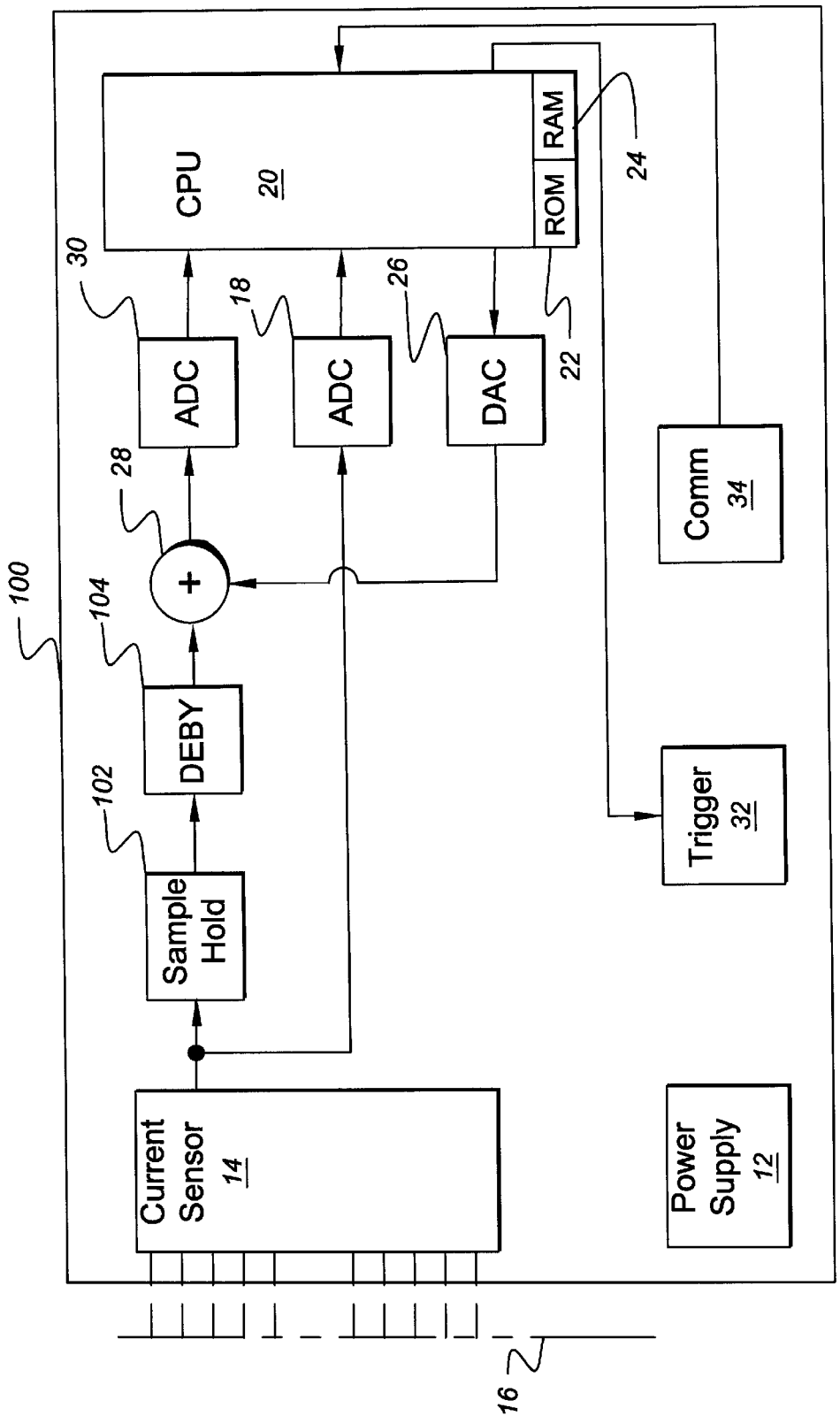
FIG. 2 is a block diagram of a mixed signal application specific integrated circuit architecture in accordance another embodiment of the present invention.

FIG. 2 illustrates yet another embodiment of mixed signal application specific integrated circuit 100, which includes a sample and hold circuit 102 coupled to the output of current sensor 14, and a delay unit 104 coupled to the output of sample and hold circuit 102. Sample and hold circuit 102 and delay unit 104 provide a sample of the output signal from current sensor 14 to summer 28 and compensate for any delay resulting from CPU 20 and DAC 26 processing. Of course, units 102 and 104 can be utilized in combination with the circuits using a PLL or DDS in place of DAC 26.

Figure 3:
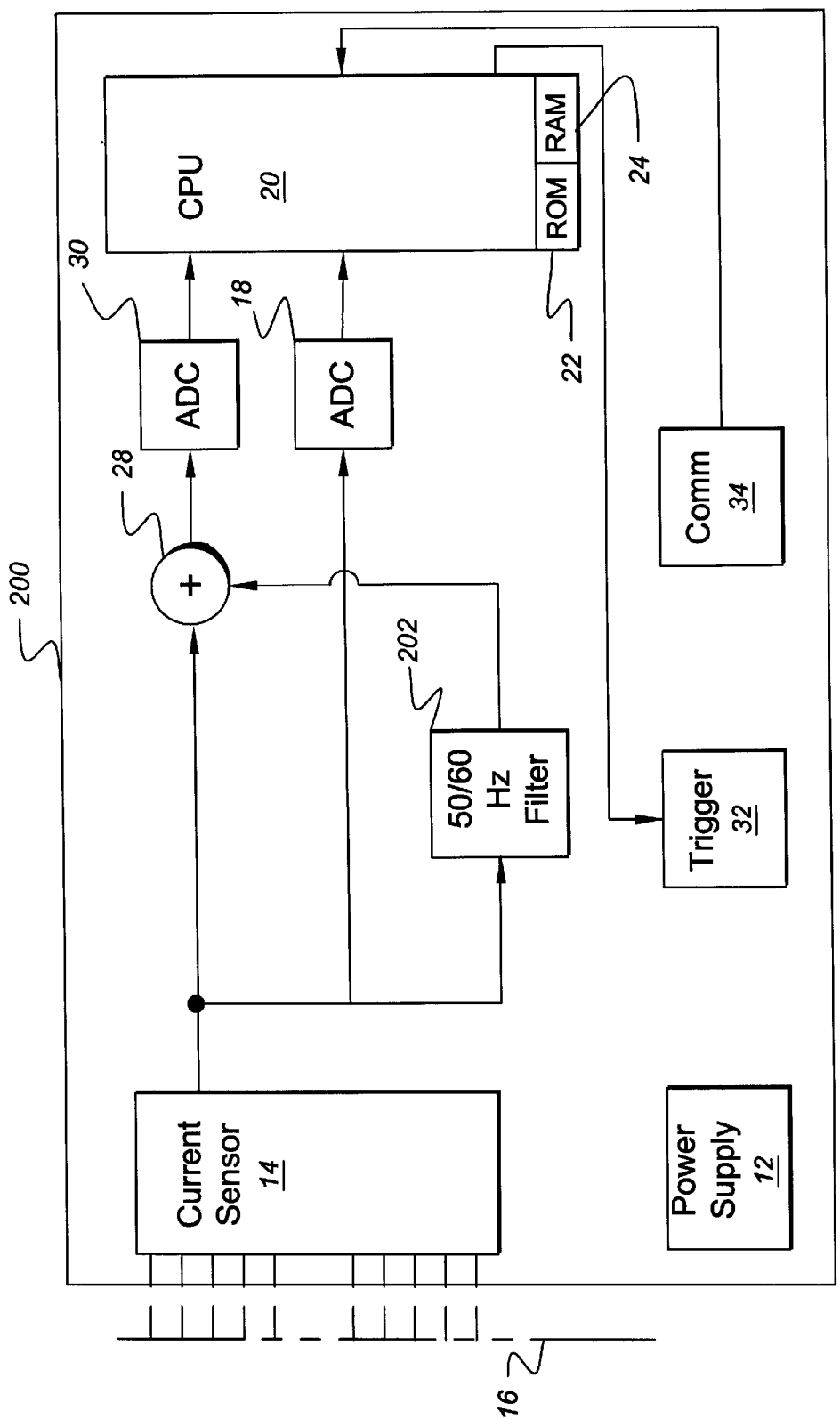
FIG. 3 is a block diagram of a mixed signal application specific integrated circuit architecture in accordance with yet another embodiment of the present invention.

FIG. 3 illustrates still another embodiment 200 of a mixed signal application specific integrated circuit, which includes a 50 or 60 Hz filter 202. The signal from current sensor 14 is supplied to both summer 28 and filter 202. In this embodiment, CPU 20 does not have to perform the filter function and DAC 26 is eliminated, leaving filter 202 to perform the function of supplying a substantially noise-free 60 or 50 Hz signal to summer 28.

Those skilled in the art will recognize that the apparatus shown in FIG. 4 may be employed to completely remove the residual 50 Hz or 60 Hz fundamental frequency in the embodiments shown in FIGS. 2 and 3 in the same manner as described in conjunction with FIG. 1.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. Apparatus for detecting arcs from a signal provided by a current sensor for sensing current in an AC power line, said apparatus comprising:

a central processing unit coupled to the current sensor for receiving a signal representative of current sensed by the current sensor; and a summer having a first input coupled to the current sensor, a second input coupled to an output of said central processing unit, and an output coupled to an input of said central processing unit.

2. Apparatus in accordance with claim 1 further comprising a digital-to-analog converter coupled between said central processing unit and said summer for supplying an analog signal to the summer second input.

3. Apparatus in accordance with claim 1 wherein said central processing unit comprises a read only memory and a random access memory.

4. Apparatus in accordance with claim 1 wherein said central processing unit comprises a general purpose microprocessor.

5. Apparatus in accordance with claim 1 further comprising a circuit breaker trigger coupled to an output of said central processing unit.

6. Apparatus in accordance with claim 1 further comprising a communications line, said central processing unit being coupled to said communications line for bidirectional data transfer.

7. Apparatus in accordance with claim 1 further comprising a phase locked loop circuit coupled between said central processing unit and said summer.

8. Apparatus in accordance with claim 1 further comprising a direct digital synthesizer coupled between said central processing unit and said summer.

9. Apparatus in accordance with claim 1 further comprising a first analog-to-digital converter coupled between the current sensor and said central processing unit for converting an analog signal produced by the current sensor to a digital signal representative of current sensed by the current sensor.

10. Apparatus in accordance with claim 9 further comprising a second analog-to-digital converter coupled between said summer and said central processing unit for supplying a digital signal to said central processing unit converted from an analog output signal produced by said summer.

11. Apparatus in accordance with claim 9 further comprising a second analog-to-digital converter coupled to the output of said summer, a decimator coupled to the output of said second analog-to-digital converter, a nulls filter coupled to the output of said decimator, and a phase locked loop circuit coupling the output of said second analog-to-digital converter to a sample rate control input of said second analog-to-digital converter in order to synchronize the rate at which said second analog-to-digital converter samples AC power in said power line.

12. Apparatus for detecting arcs on an AC power line, comprising:

a current sensor;

a central processing unit coupled to receive a signal representative of current sensed by said current sensor;

a summer having a first input coupled to said current sensor, and an output coupled to an input of said central processing unit;

a first analog-to-digital converter coupled between said current sensor and said central processing unit for converting an analog signal produced by said current sensor to a digital signal representative of current sensed by said current sensor; and a digital-to-analog converter coupling said central processing unit to said summer for supplying an analog signal to a second input of said summer.

13. Apparatus in accordance with claim 12 wherein said current sensor comprises a current transformer.

14. Apparatus in accordance with claim 12 wherein said current sensor comprises a current-to-voltage transducer.

15. Apparatus in accordance with claim 12 further comprising a second analog-to-digital converter coupled between said summer and said central processing unit for supplying a digital signal to said central processing unit.

16. Apparatus in accordance with claim 12 wherein said central processing unit comprises a read only memory and a random access memory.

17. Apparatus in accordance with claim 12 wherein said central processing unit is programmed to execute a correlation function.

18. Apparatus in accordance with claim 12 further comprising a circuit breaker trigger coupled to an output of said central processing unit.

19. Apparatus in accordance with claim 12 further comprising a communications line, said central processing unit being coupled to said communications line for bidirectional data transfer.

20. Apparatus in accordance with claim 12 further comprising a second analog-to-digital converter coupled to the output of said summer, a decimator coupled to the output of said second analog-to-digital converter, a nulls filter coupled to the output of said decimator, and a phase locked loop circuit coupling the output of said second analog-to-digital converter to a sample rate control input of said second analog-to-digital converter in order to synchronize the rate at which said second analog-to-digital converter sample AC power in said power line.

21. Apparatus for detecting arcs from a signal produced by a current sensor for sensing current in an AC power line, said apparatus comprising:

a central processing unit coupled to the current sensor for receiving a signal, including a fundamental signal, representative of current sensed by the current sensor; and a summer having a first input coupled to the current sensor, and an output coupled to an input of said central processing unit, said summer being configured to subtract the fundamental signal from the current sensor signal.

22. Apparatus in accordance with claim 21 further comprising a sample and hold circuit coupled between the current sensor and said summer.

23. Apparatus in accordance with claim 21 further comprising a filter coupled between the current sensor and a second input of said summer.

24. Apparatus in accordance with claim 21 further comprising a delay unit coupled between the sample and hold circuit and said summer.

* * * * *